US009411350B1

(12) United States Patent
Yem

(10) Patent No.: US 9,411,350 B1
(45) Date of Patent: Aug. 9, 2016

(54) VOLTAGE CONVERSION APPARATUS AND POWER-ON RESET CIRCUIT AND CONTROL METHOD THEREOF

(71) Applicant: Poh-Weng Yem, Penang (MY)

(72) Inventor: Poh-Weng Yem, Penang (MY)

(73) Assignee: PIXART IMAGING (PENANG) SDN. BHD., Penang (MY)

( * ) Notice: Subject to any disclaimer, the term of this patent is extended or adjusted under 35 U.S.C. 154(b) by 3 days.

(21) Appl. No.: 14/615,223

(22) Filed: Feb. 5, 2015

(51) Int. Cl.
*G05F 1/56* (2006.01)
*G05F 1/575* (2006.01)

(52) U.S. Cl.
CPC ..................... *G05F 1/575* (2013.01)

(58) Field of Classification Search
CPC ........... G05F 1/56; G05F 1/565; G05F 1/575; H02M 3/156–3/158; H02M 3/1584; H02M 3/1588
USPC .................................................. 323/270–285
See application file for complete search history.

(56) References Cited

U.S. PATENT DOCUMENTS

| | | | | |
|---|---|---|---|---|
| 7,728,573 B2* | 6/2010 | Capilla | ............... | H02M 3/1588 323/271 |
| 9,035,636 B2* | 5/2015 | Colbeck | ............... | H02M 7/066 323/282 |
| 2010/0148741 A1* | 6/2010 | Chen | ..................... | H02M 3/158 323/285 |

* cited by examiner

*Primary Examiner* — Yemane Mehari
(74) *Attorney, Agent, or Firm* — Tung & Associates

(57) ABSTRACT

The present invention discloses a voltage conversion apparatus and a power-ON reset (POR) circuit and a control method thereof. The voltage conversion apparatus includes: a conversion circuit, an input status detection circuit, an output status detection circuit, a status feedback circuit, and a POR circuit. The POR circuit generates a POR signal according to an input status signal, an output status signal, and a feedback signal, to indicate whether a POR procedure is completed. The POR circuit includes: a logic circuit, for generating a reset signal indicating whether both the input and output voltages are ready; and a delay circuit, for generating the POR signal by delaying a predetermined time period according to the reset signal and a feedback signal related to the POR signal.

19 Claims, 6 Drawing Sheets

VOLTAGE CONVERSION APPARATUS AND POWER-ON RESET CIRCUIT AND CONTROL METHOD THEREOF

BACKGROUND OF THE INVENTION

1. Field of Invention

The present invention relates to a voltage conversion apparatus, and a power-ON reset circuit and a control method thereof; particularly, it relates to such voltage conversion apparatus and power-ON reset circuit and control method thereof which generate a power-ON rest signal according to the statuses of input and output voltages.

2. Description of Related Art

A voltage conversion apparatus converts an input voltage to an output voltage which is provided to a load circuit. When power supplied to the voltage conversion apparatus is reset and restarted (i.e., power-ON reset), a power-ON reset (POR) circuit determines whether the input voltage and the output voltage reach an input voltage predetermined level and an output voltage predetermined level, respectively. When the input voltage reaches the input voltage predetermined level and the output voltage also reaches the output voltage predetermined level, the POR circuit generates a POR signal having a level which indicates that the voltage conversion apparatus is ready for voltage conversion to supply the output voltage properly. When the input voltage or the output voltage does not reach the predetermined level, the POR circuit generates the POR signal having another level which indicates that the voltage conversion apparatus is not ready for voltage conversion to supply the output voltage properly.

One method to achieve voltage conversion is by using a charge pump. However, in existing prior art, the integration of a charge pump with a POR circuit is complicated, resulting in a large-size circuit and a complicated control scheme. Besides, voltage variations may cause the POR circuit to generate an inaccurate POR signal.

In view of above, to overcome the drawbacks in the prior art, the present invention proposes a voltage conversion apparatus and a power-ON reset circuit and a control method thereof, which can generate the POR signal with high accuracy according to the input voltage and the output voltage, and the circuitry is relatively simpler and smaller.

SUMMARY OF THE INVENTION

The present invention provides a voltage conversion apparatus, including: a conversion circuit, for converting an input voltage to an output voltage according to a status feedback signal; an input status detection circuit, which is coupled to the conversion circuit, for generating an input status signal according to the input voltage and a first reference voltage; an output status detection circuit, which is coupled to the conversion circuit and the input status detection circuit, for generating an output status signal according to the input status signal, the output signal, and a second reference voltage; a status feedback circuit, which is coupled to the output status detection circuit and the conversion circuit, for generating the status feedback signal according to the output status signal; and a power-ON reset circuit, which is coupled to the input status detection circuit and the output status detection circuit, for generating a power-ON reset signal according to the input status signal, the output status signal, and a first feedback signal, wherein the power-ON reset signal indicates whether a power-ON reset procedure of the voltage conversion apparatus is completed, the power-ON reset circuit including: a first logic circuit, which is coupled to the input status detection circuit and the output status detection circuit, for generating a first reset signal according to the input status signal and the output status signal, and generating a first determined clock signal according to the first feedback signal and a clock signal, wherein the first reset signal is set to a predetermined first reset signal level when both the input status signal indicates that the input voltage is ready and the output status signal indicates that the output voltage is ready; and a first delay circuit, which is coupled to the first logic circuit, for delaying a first predetermined period of time according to the first reset signal and the first determined clock signal, to generate a first power-ON reset signal related to the power-ON reset signal, wherein the first reset signal determines whether to start the first predetermined period of time and the first determined clock signal determines a clock to count the first predetermined period of time; wherein the first feedback signal relates to the first power-ON reset signal.

In one embodiment, after the first reset signal is set to the predetermined first reset signal level, when either the input status signal indicates that the input voltage is not ready or the output status signal indicates that the output voltage is not ready, the first reset signal is still set to the predetermined first reset signal level, and when both the input status signal indicates that the input voltage is not ready and the output status signal indicates that the output voltage is not ready, the first reset signal is set not to be at the predetermined first reset signal level.

In one embodiment, the conversion circuit includes a charge pump circuit, and wherein the status feedback signal includes a first clock signal and a second clock signal which do not overlap each other, for operating different power switches respectively to boost the input voltage to the output voltage.

In one embodiment, the input status detection circuit includes: a first voltage divider circuit, which is coupled to the conversion circuit, for receiving the input voltage to generate a first divided voltage; and a first comparison circuit, which is coupled to the first voltage divider circuit, for comparing the first divided voltage with the first reference voltage, to generate the input status signal.

In one embodiment, the output status detection circuit includes: a second voltage divider circuit, which is coupled to the conversion circuit, for receiving the output voltage to generate a second divided voltage; a second comparison circuit, which is coupled to the second voltage divider circuit, for comparing the second divided voltage with the second reference voltage, to generate an output comparison signal; and a determination circuit, which is coupled to the input status detection circuit and the second comparison circuit, for generating the output status signal according to the input status signal and the output comparison signal.

In one embodiment, when the input status signal indicates that the input voltage is not ready, the determination circuit sets the output status signal to a predetermined output status signal level, and when the input status signal indicates that the input voltage is ready, the determination circuit sets the output status signal to follow the output comparison signal.

In one embodiment, the first logic circuit further includes a one-time reset circuit for generating an initial power-ON reset signal to indicate whether the input voltage is ready, and after the initial power-ON reset signal indicates that the input voltage is ready, the initial power-ON reset signal does not change state until the voltage conversion apparatus is shut down.

In one embodiment, the power-ON reset circuit further includes: a second logic circuit, which is coupled to the first delay circuit, for generating a second reset signal according to the first power-ON reset signal, and generating a second determined clock signal according to a second feedback signal and the clock signal; and a second delay circuit, which is coupled to the second logic circuit, for delaying a second predetermined period of time according to the second reset signal and the second determined clock signal, so as to generate a second power-ON reset signal, wherein the second reset signal determines whether to start the second predetermined period of time and the second determined clock signal determines a clock to count the second predetermined period of time; wherein the second feedback signal relates to the second power-ON reset signal.

The present invention also provides a power-ON reset circuit of a voltage conversion apparatus which converts an input voltage to an output voltage according to a status feedback signal, the power-ON reset circuit comprising: a first logic circuit, for generating a first reset signal which is set to a predetermined first reset signal level when both the input voltage is ready and the output voltage is ready, and generating a first determined clock signal according to a first feedback signal and a clock signal; and a first delay circuit for delaying a first predetermined period of time according to the first reset signal and the first determined clock signal, to generate a first power-ON reset signal, wherein the first reset signal determines whether to start the first predetermined period of time and the first determined clock signal determines a clock to count the first predetermined period of time; wherein the first feedback signal relates to the first power-ON reset signal.

The present invention also provides a control method of a voltage conversion apparatus, comprising: converting an input voltage to an output voltage according to a status feedback signal; generating an input status signal according to the input voltage and a first reference voltage; generating an output status signal according to the input status signal, the output signal, and a second reference voltage; generating the status feedback signal according to output status signal; and generating a power-ON reset signal according to the input status signal, the output status signal, and a first feedback signal, wherein the power-ON reset signal indicates whether a power-ON reset procedure of the voltage conversion apparatus is completed; wherein the step of generating the power-ON reset signal includes: generating a first reset signal according to the input status signal and the output status signal, and generating a first determined clock signal according to the first feedback signal and a clock signal, wherein the first reset signal is set to a predetermined first reset signal level when both the input status signal indicates that the input voltage is ready and the output status signal indicates that the output voltage is ready; and delaying a first predetermined period of time according to the first reset signal and the first determined clock signal, to generate a first power-ON reset signal related to the power-ON reset signal, wherein the first reset signal determines whether to start the first predetermined period of time and the first determined clock signal determines a clock to count the first predetermined period of time; wherein the first feedback signal relates to the first reset signal.

The objectives, technical details, features, and effects of the present invention will be better understood with regard to the detailed description of the embodiments below.

DESCRIPTION OF THE PREFERRED EMBODIMENTS

Figure 1:
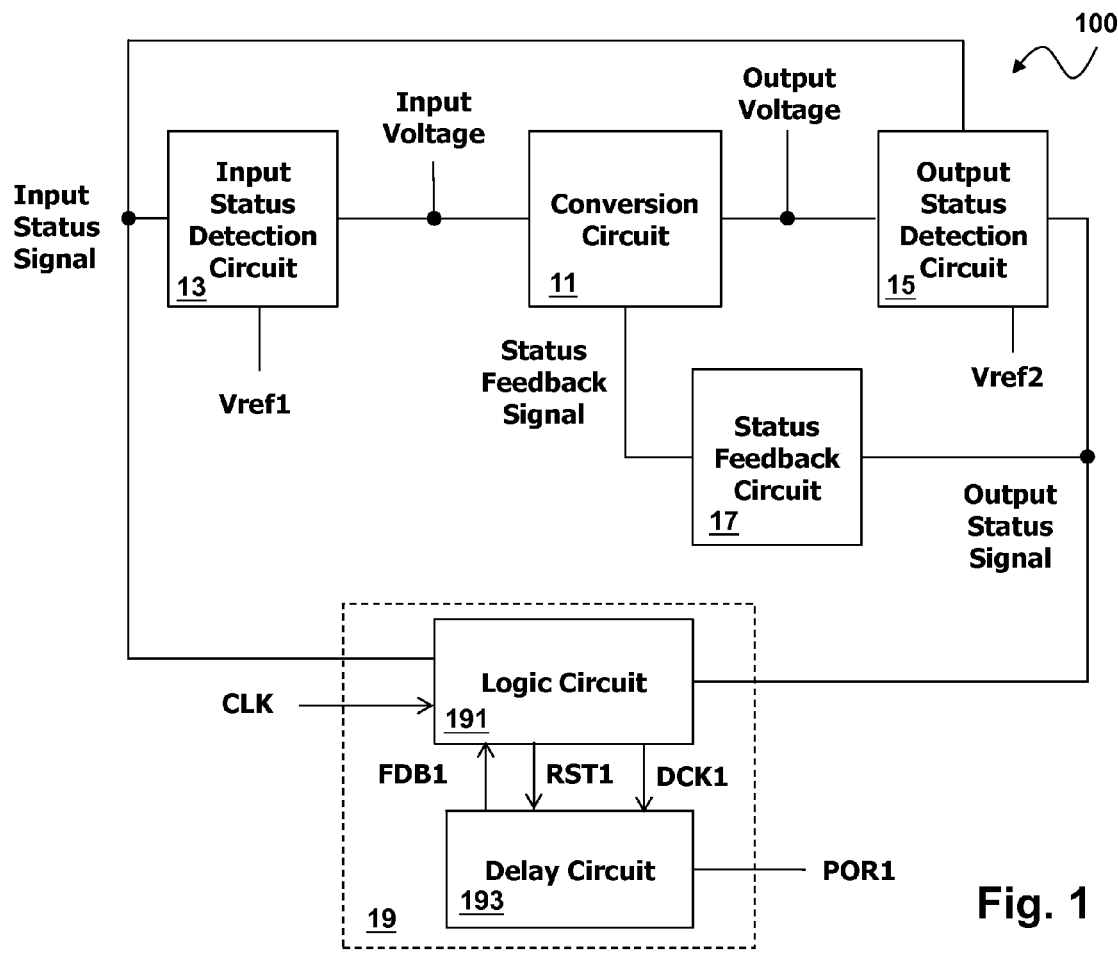
FIG. 1 shows a first embodiment of the present invention, which shows a schematic diagram of a voltage conversion apparatus 100.

Please refer to FIG. 1 for a first embodiment according to the present invention. FIG. 1 shows a schematic diagram of a voltage conversion apparatus 100. As shown in FIG. 1, the voltage conversion apparatus 100 includes a conversion circuit 11, an input status detection circuit 13, an output status detection circuit 15, a status feedback circuit 17, and a power-ON reset (POR) circuit 19. The conversion circuit 11 converts an input voltage to an output voltage according to a status feedback signal. In one embodiment of the present invention, the input voltage and the output voltage may have one or plural target levels respectively. The input status detection circuit 13 is coupled to the conversion circuit 11, for generating an input status signal according to the input voltage and a reference voltage Vref1. The output status detection circuit 15 is coupled to the conversion circuit 11 and the input status detection circuit 13, for generating an output status signal according to the output voltage, the input status signal, and a reference voltage Vref2. The status feedback circuit 17 is coupled to the output status detection circuit 15 and the conversion circuit 11, for generating a status feedback signal according to the output status signal. The power-ON reset circuit 19 is coupled to the input status detection circuit 13 and the output status detection circuit 15, for generating a power-ON reset signal POR1 according to the input status signal, the output status signal, and a feedback signal FDB1. The power-ON reset signal POR1 indicates whether the power-ON reset procedure of the voltage conversion apparatus 100 has been completed, that is, whether the input voltage has reached an input voltage predetermined level and the output voltage has also reached an output voltage predetermined level. When the power-ON reset signal POR1 generated by the POR circuit 19 is at a predetermined level, referred to as a "POR ready level", it indicates that the voltage conversion apparatus 100 can operate normally for voltage conversion to supply the output voltage.

The power-ON reset circuit 19 includes a logic circuit 191 and a delay circuit 193. The logic circuit 191 is coupled to the input circuit 13 and the output status detection circuit 15, for generating a reset signal RST1 according to the input status signal and the output status signal, and generating a determined clock signal DCK1 according to the feedback signal FDB1 and a clock signal CLK. The delay circuit 193 is coupled to the logic circuit 191, for delaying a predetermined period of time to generate the power-ON reset signal POR1 according to the reset signal RST1 and the determined clock signal DCK1. The feedback signal FDB1 is related to the power-ON reset signal POR1; in one embodiment, the feedback signal FDB1 is for example but not limited to the power-ON reset signal POR1 itself.

Figure 2:
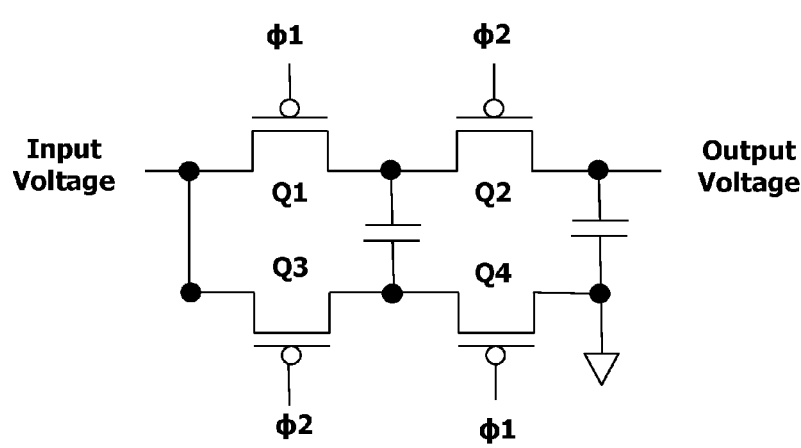
FIG. 2 shows a second embodiment of the present invention, which shows an embodiment of a conversion circuit 11.

FIG. 2 shows a second embodiment of the present invention, which shows a more specific embodiment of the conversion circuit 11. As shown in FIG. 2, the conversion circuit 11 is for example but not limited to a charge pump circuit, and the status feedback signal includes a clock signal Ø1 and a clock signal Ø2 which do not overlap each other, for operating power switches Q1, Q2, Q3, and Q4 respectively to boost the input voltage to the output voltage. Note that in other embodiments of the present invention, the conversion circuit 11 is not limited to the charge pump circuit, but can be other forms of the conversion circuits such as a switching regulator, etc. In this embodiment, the status feedback signal includes the clock signal Ø1 and the clock signal Ø2 which do not overlap each other, and when the output voltage is lower than the output voltage predetermined level, the clock signal Ø1 and the clock signal Ø2 switch between a high level and a low level to boost the output voltage to the output voltage predetermined level. When the output voltage reaches the output voltage predetermined level, the clock signal Ø1 and the clock signal Ø2 for example do not switch between the high level and the low level but stay at the high level and the low level respectively. Thus, the output voltage can be regulated at the output voltage predetermined level.

Figure 3:
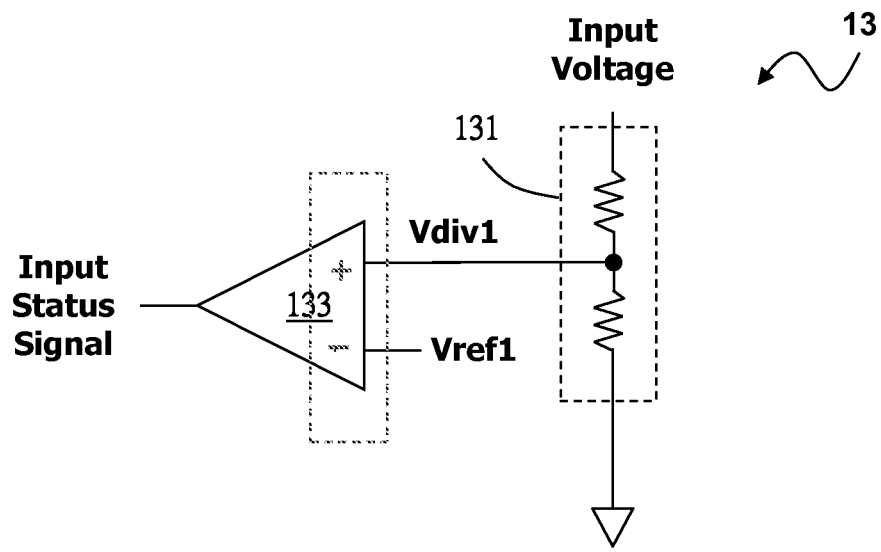
FIG. 3 shows a third embodiment of the present invention, which shows an embodiment of an input status detection circuit 13.

FIG. 3 shows a third embodiment of the present invention, which shows a more specific embodiment of the input status detection circuit 13. As shown in FIG. 3, the input status detection circuit 13 for example includes a voltage divider circuit 131 and a comparison circuit 133. The voltage divider circuit 131 is coupled to the conversion circuit 11, for receiving the input voltage to generate a divided voltage Vdiv1. The divided voltage Vdiv1 is for example proportional to the input voltage. The comparison circuit 133 is coupled to the voltage divider circuit 131, for comparing the divided voltage Vdiv1 with the reference voltage Vref1, to generate the input status signal. Thus, by setting the reference voltage Vref1 to a proper level, when the input voltage reaches the input voltage predetermined level, the divided voltage Vdiv1 reaches the reference voltage Vref1, and the input status signal switches state to a level indicating that the input voltage is ready, which is for example the high level.

Figure 4:
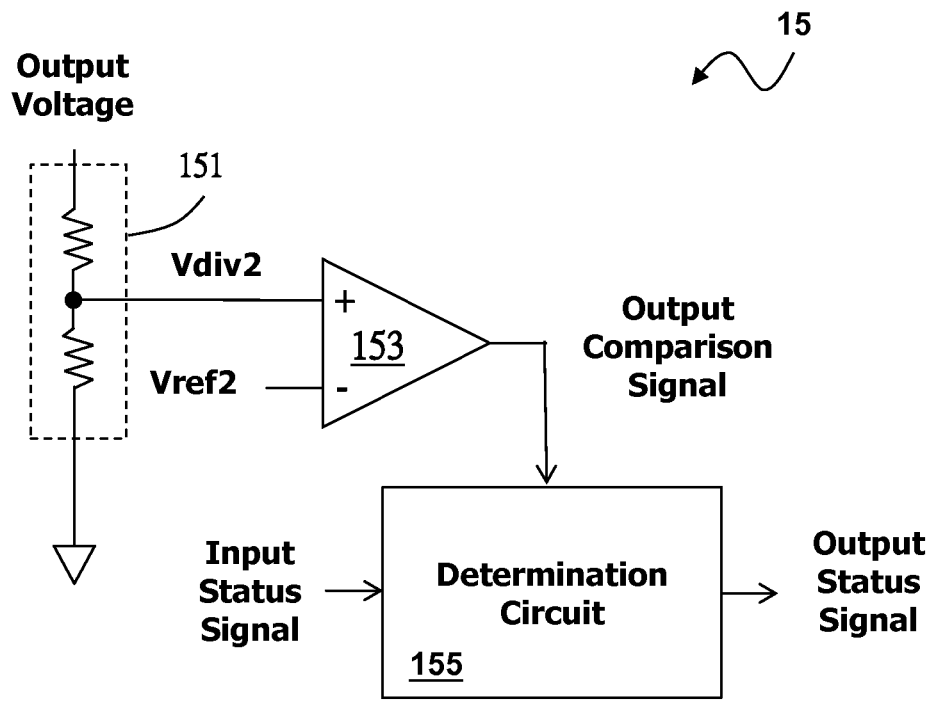
FIG. 4 shows a fourth embodiment of the present invention, which shows an embodiment of an output status detection circuit 15.

FIG. 4 shows a fourth embodiment of the present invention, which shows a more specific embodiment of the output status detection circuit 15. As shown in FIG. 4, the output status detection circuit 15 for example includes a voltage divider circuit 151, a comparison circuit 153, and a determination circuit 155. The voltage divider circuit 151 is coupled to the conversion circuit 11, for receiving the output voltage to generate a divided voltage Vdiv2. The divided voltage Vdiv2 is for example proportional to the output voltage. The comparison circuit 153 is coupled to the voltage divider circuit 151, for comparing the divided voltage Vdiv2 with the reference voltage Vref2, to generate an output comparison signal. The determination circuit 155 is coupled to the input status detection circuit 13 and the comparison circuit 153, for generating the output status signal according to the input status signal and the output comparison signal. The determination circuit 155 determines whether the output status signal should follow the output comparison signal, or should be set to a predetermined level, according to the input status signal. The predetermined level that the output status signal is set to can be a high level or a low level, and the status feedback circuit 17 can be designed accordingly. For simplicity in description, for example, the predetermined level is a high level in this embodiment. That is, when the input voltage is not yet ready (the input voltage has not yet reached the input voltage predetermined level), the determination circuit 155 sets the output status signal to the predetermined level, which is the high level in this embodiment; when the input voltage is ready (the input voltage has reached the input voltage predetermined level), the determination circuit 155 sets the output status signal to follow the output comparison signal, that is, when the output comparison signal is high, the output status signal is also high, and when the output comparison signal is low, the output status signal is also low.

Figure 5:
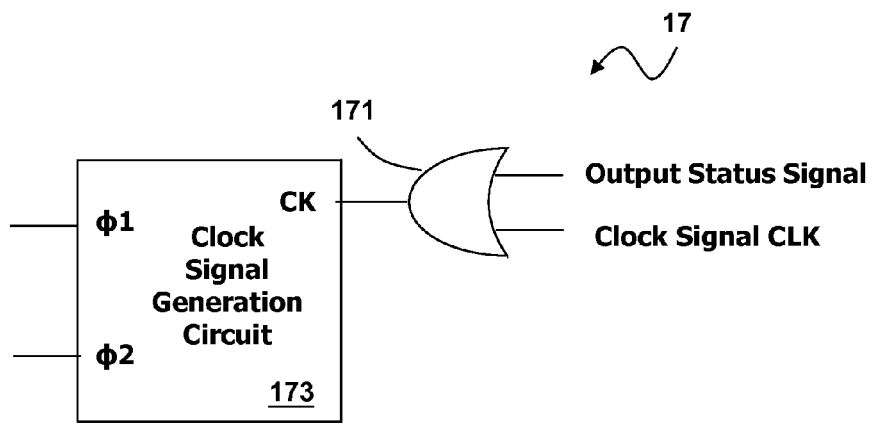
FIG. 5 shows a fifth embodiment of the present invention, which shows an embodiment of a status feedback circuit 17.

FIG. 5 shows a fifth embodiment of the present invention, which shows a more specific embodiment of the status feedback circuit 17. As shown in FIG. 5, the status feedback circuit 17 includes a logic gate 171 and a clock signal generation circuit 173. The logic gate 17 is for example but not limited to an OR gate, which receives the output status signal and the clock signal CLK. When the output status signal is at the high level, an output signal generated by the logic gate 171 is at the high level; when the output status signal is at the low level, the output signal of the logic gate 171 follows the clock signal CLK. The clock signal generation circuit 173 has a clock input terminal CK which receives the output signal of the logic gate 171, whereby the clock signal generation circuit 173 generates the clock signal Ø1 and the clock signal Ø2. When the output signal of the logic gate 171 received by the clock input terminal CK maintains at the high level, it is because the output status signal maintains at the high level, which indicates that the output voltage is kept at or higher than the output voltage predetermined level; in this case the conversion circuit can withhold the voltage conversion operation. When the output signal of the logic gate 171 received by the clock input terminal CK is the clock signal CLK, the clock signal Ø1 and the clock signal Ø2 switch between the high level and the low level, whereby the conversion circuit performs the boost voltage conversion to regulate the output voltage to the output voltage predetermined level.

Figure 6:
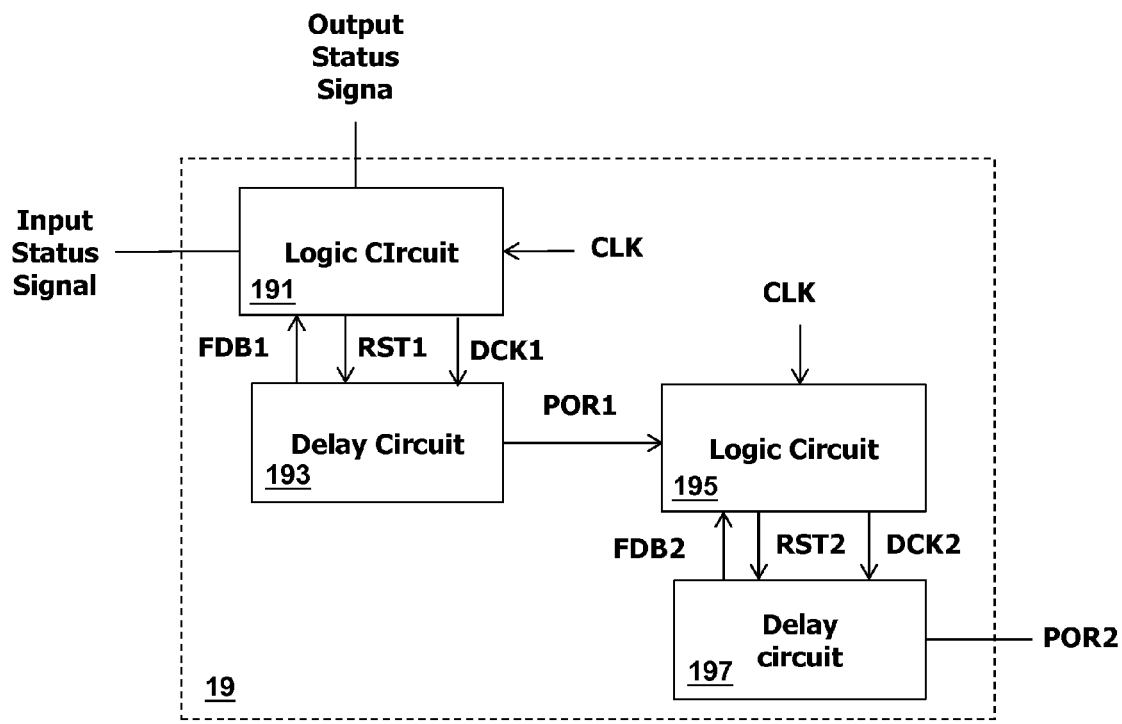
FIG. 6 shows a sixth embodiment of the present invention, which shows an embodiment of a power-ON reset (POR) circuit 19.

FIG. 6 shows a sixth embodiment of the present invention, which shows another embodiment of the power-ON reset circuit 19. As shown in FIG. 6, this embodiment is different from the first embodiment in that, the power-ON reset circuit 19 further includes a logic circuit 195 and a delay circuit 197 besides the logic circuit 191 and the delay circuit 193. The logic circuit 195 is coupled to the delay circuit 193, for generating a reset signal RST2 according to the power-ON reset signal POR1, and generating a determined clock signal DCK2 according to a feedback signal FDB2 and the clock signal CLK. The delay circuit 197 is coupled to the logic circuit 195, for further delaying a predetermined period of time to generate a power-ON reset signal POR2 according to the reset signal RST2 and the determined clock signal DCK2. The feedback signal FDB2 is related to the power-ON reset signal POR2; for example, in one embodiment, the feedback signal FDB2 is the power-ON reset signal POR2 itself. In the first embodiment, the power-ON reset signal POR1 is provided as the power-ON reset signal; in this embodiment, the power-ON reset signal POR2 is provided as the power-ON reset signal.

Note that the clock signals CLK received by the logic circuit 191 and the logic circuit 195 may be the same or different. In this embodiment, after the power-ON reset signal POR1 generated by the delay circuit 193 indicates that the power is ready (for example when the power-ON reset signal POR1 switches from the low level to the high level), the power-ON reset circuit 19 further delays a predetermined period of time to ensure that the power is indeed ready, so that the power-ON reset signal POR2 is accurate for sure.

Figure 7:
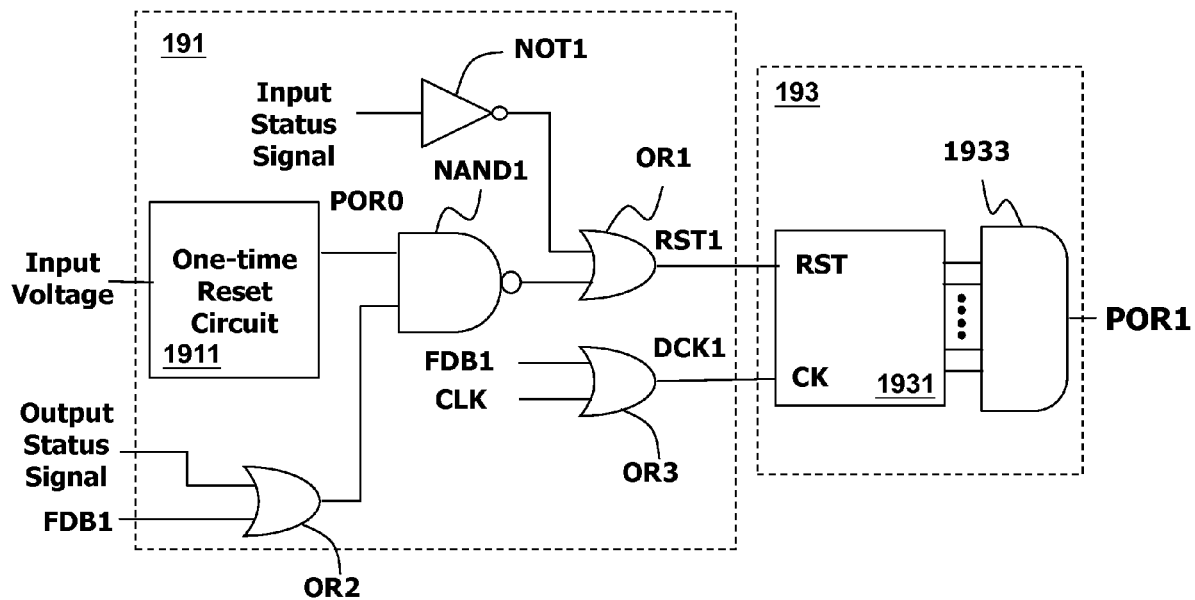
FIG. 7 shows a seventh embodiment of the present invention, which shows an embodiment of a logic circuit 191 and a delay circuit 193.

FIG. 7 shows a seventh embodiment of the present invention, which shows a more specific embodiment of the logic circuit 191 and the delay circuit 193. In this embodiment, the logic circuit 191 generates the reset signal RST1 according to an initial power-ON reset signal POR0 besides the input status signal and the output status signal, wherein the initial power-ON reset signal POR0 is generated by a one-time reset circuit 1911. When the input voltage reaches the input voltage predetermined level, the one-time reset circuit 1911 sets the initial power-ON reset signal POR0 to a predetermined level and it is not changed afterward unless the circuit is shut down. The one-time reset circuit 1911 is preferred but not necessary; it can be omitted and the logic circuit 191 can generate the reset signal RST1 according to the input status signal and the output status signal. Note that in other embodiments of the present invention, the one-time reset circuit 1911 can be any other forms of the power-ON reset circuit or any other forms of the voltage level detection circuit.

As shown in FIG. 7, a NOT gate NOT1 receives the input status signal to generate an inverted signal which is sent to an OR gate OR1. The one-time reset circuit 1911 generates the initial power-ON reset signal POR0 which for example maintains at the high level after the input voltage has reached the input voltage predetermined level. An OR gate OR2 receives the output status signal and the feedback signal FDB1 to generate an output signal. A NAND gate NAND1 receives the initial power-ON reset signal POR0 and the output signal of the OR gate OR2 to generate an output signal which is inputted to the OR gate OR1. The OR gate OR1 receives the output signal of the NOT gate NOT1 and the output signal of the NAND gate NAND1, to generate the reset signal RST1.

The aforementioned logic gates operate as thus. When the input voltage is not ready (that is, the input voltage has not yet reached the input voltage predetermined level), the input status signal is at the low level, and the output signal of the OR gate OR1 which is the reset signal RST1 is at the high level, indicating that the power-ON reset procedure has not been completed. When the input voltage is ready (that is, the input voltage has reached the input voltage predetermined level) the input status signal is at the high level, and the output signal of the OR gate OR1 is determined by the output signal of the NAND gate NAND1. Since the input voltage has reached the input voltage predetermined level, the initial power-ON reset signal POR0 is kept at the high level. Assuming that the feedback signal FDB1 maintains at the low level (the feedback signal FDB1 for example can be the power-ON reset signal POR1 or a signal that is delayed from the power-ON reset signal POR1), the output signal of the OR gate OR2 is determined by the output status signal, which means that the output signal of the NAND gate NAND1 is determined by the output status signal. Therefore, after the input voltage is ready, the reset signal RST1 switches to the low level when the output status signal is ready (that is, the output voltage has reached the output voltage predetermined level).

Clearly, there are numerous ways to achieve the same effect by different arrangements of different logic gates. For example, the one-time reset circuit 1911 and the NAND gate NAND1 can be omitted (the output signal of the OR gate OR2 is inverted and sent to an input of the OR gate OR1). For another example, the not gate NOT1 can be omitted and NAND gate NAND1 can be replaced by an AND gate, and correspondingly, the OR gate OR1 can be replaced by a NAND gate. Hence, the number and types of the logic gates can vary. All such and other variations should all fall within the scope of the present invention.

In this embodiment, an OR gate OR3 receives the feedback signal FDB1 and the clock signal CLK, and generates the determined clock signal DCK1. When the feedback signal FDB1 is at the low level, the determined clock signal DCK1 is determined by the clock signal CLK. The determined clock signal DCK1 is inputted to a clock input terminal CK of a multi-bit counter circuit 1931. The multi-bit counter circuit 1931 has a reset input terminal RST which receives the reset signal RST1. The multi-bit counter circuit 1931 counts according to the reset signal RST1 and the determined clock signal DCK1. The multi-bit count generated by the multi-bit counter circuit 1931 is inputted to a multi-bit AND gate 1933. The multi-bit AND gate 1933 receives and operates the multi-bit count of the multi-bit counter circuit 1931 to generate the power-ON reset signal POR1. The power-ON reset signal POR1 for example can be used as the power-ON reset signal for indicating that the power-ON reset procedure has completed.

The delay circuit 193 operates as thus. The multi-bit counter circuit 1931 is reset when the reset signal RST1 is at the high level, while multi-bit counter circuit 1931 is triggered to count when the reset signal RST1 changes from the high level to the low level. If the power-ON reset procedure has not yet completed, the feedback signal FDB1 is still at the low level, so the determined clock signal DCK1 follows the clock signal CLK and is inputted to the clock input terminal CK of the multi-bit counter circuit 1931. The multi-bit counter circuit 1931 counts according to the determined clock signal DCK1. If the reset signal RST1 does not change to the high level, the multi-bit counter circuit 1931 counts until all its output bits are at the high level, meaning that a predetermined period of delay time has passed, and the output signal of the multi-bit AND gate 1933, i.e., the power-ON reset signal POR1, changes from the low level to the high level. The feedback signal FDB1, which is related to the power-ON reset signal POR1, changes from the low level to the high level, so the output signal of the OR gate OR3, which is the determined clock signal DCK1, maintains at the high level, such that the multi-bit counter circuit 1931 does not continue counting because its clock, i.e., the determined clock signal DCK1, maintaining at the high level.

Figure 8:
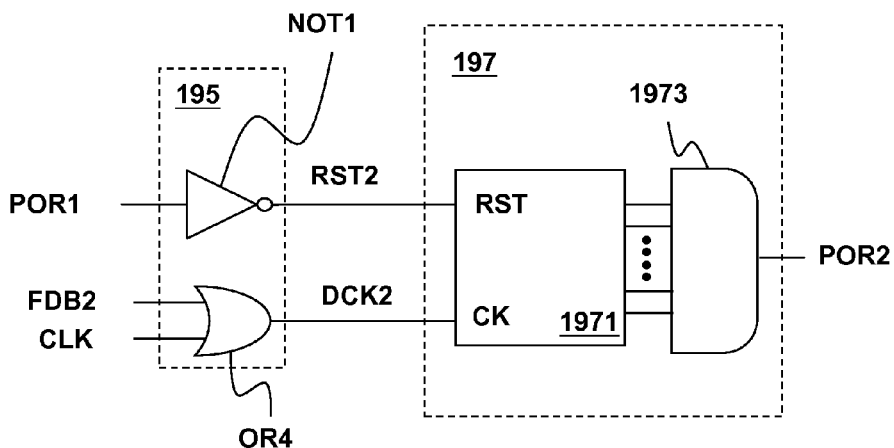
FIG. 8 shows an eighth embodiment of the present invention, which shows an embodiment of a logic circuit 195 and a delay circuit 197.

FIG. 8 shows an eighth embodiment of the present invention, which shows a more specific embodiment of the logic circuit 195 and the delay circuit 197. As shown in FIG. 8, the logic circuit 195 is coupled to the delay circuit 193, for generating the reset signal RST2 according to the power-ON reset signal POR1, and generating the determined clock signal DCK2 according to the feedback signal FDB2 and the clock signal CLK. A multi-bit counter circuit 1971 of the delay circuit 197 is coupled to the logic circuit 195, for counting a predetermined number to delay a predetermined period of time. When all the output bits of the multi-bit counter circuit 1971 are at the high level, an output signal of the multi-bit AND gate 1973, i.e., the power-ON reset signal POR2, changes from the low level to the high level. That is, when the reset signal RST2 changes from the high level to the low level, the multi-bit counter circuit 1971 starts counting according to the determined clock signal DCK2 to delay the predetermined period of time for the multi-bit AND gate 1973 to generate the power-ON reset signal POR2, wherein the feedback signal FDB2 is related to the power-ON reset signal POR2. As described in the above, the logic circuit 195 and the delay circuit 197 can further make sure the accuracy of the final power-ON reset signal.

Note that in the aforementioned and the following embodiments, the meanings of the high and low levels can be defined in other ways, and what are defined in the embodiments are only one of the ways. The delay circuit is not limited to including the aforementioned multi-bit counter circuit and the multi-bit AND gate, but may be other forms of delay circuits. For another example, the multi-bit AND gate 1933/1973 may be replaced by another logic circuit, as long as a timing signal can be generated after a predetermined period of delay time.

Figure 9:
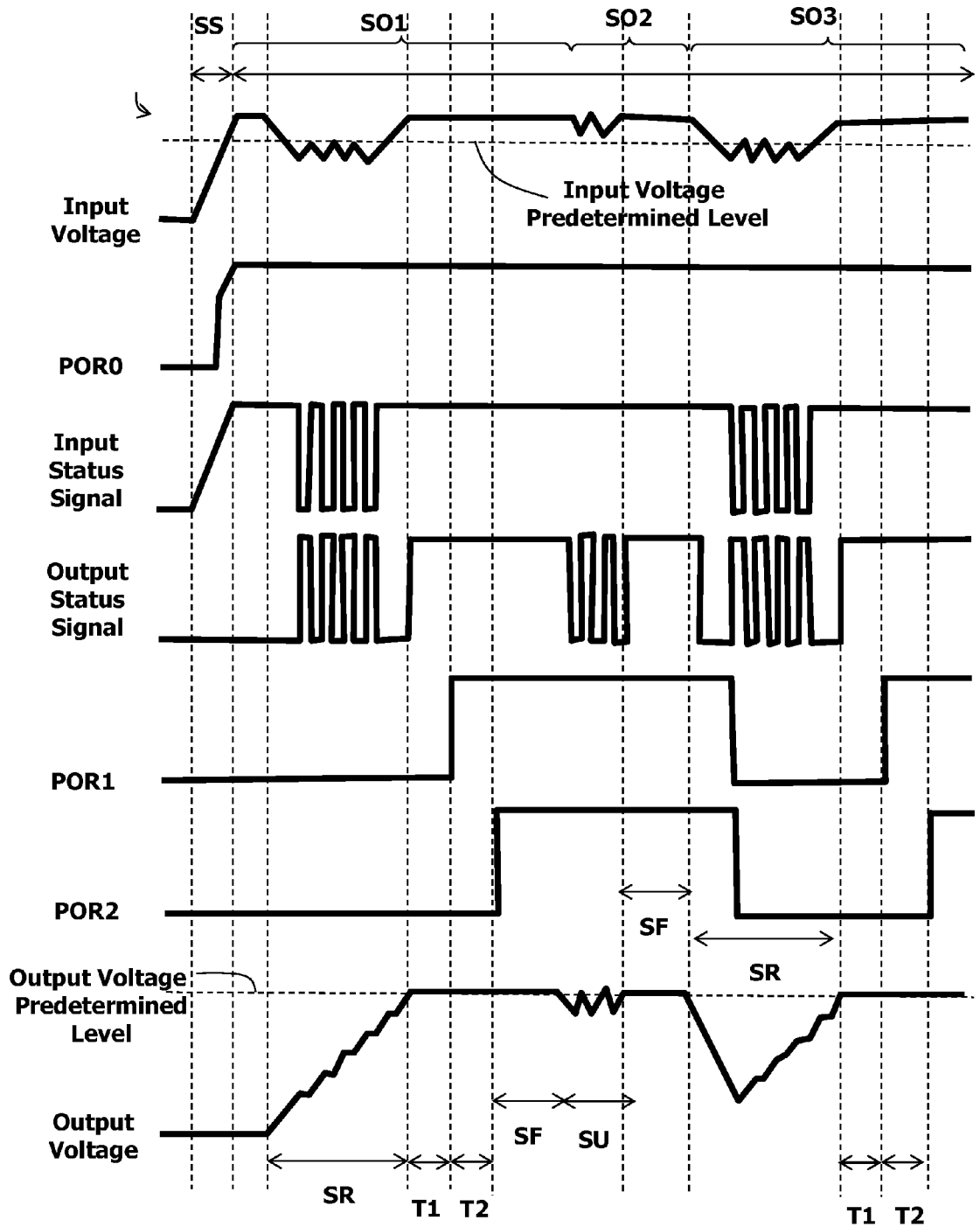
FIG. 9 shows a ninth embodiment of the present invention, which shows an embodiment of a control method of the voltage conversion apparatus.

FIG. 9 shows a ninth embodiment of the present invention, which shows an embodiment of a control method of the voltage conversion apparatus by signal waveforms. Please refer to the aforementioned first to the eighth embodiments in conjunction with FIG. 9. FIG. 9 shows several conditions that may be involved in the power-ON reset procedure by the signal waveforms. The period from the voltage conversion apparatus starts up till when the input voltage reaches the input voltage predetermined level is defined as an initial stage SS. Afterward, from when the input voltage is stable till when the input voltage has a fluctuation is defined as a processing stage (SO1-SO3). Note that, not every power-ON reset procedure includes the three processing stages SO1-SO3; for example, there may only be one processing stage SO1. FIG. 9 is only an example for explaining different conditions that may happen.

In the initial stage SS, the input voltage is increasing but is still lower than the input voltage predetermined level. The voltage conversion apparatus has not yet started voltage conversion operation, so the output voltage is 0V. The state of the output status signal at this stage is meaningless; because the circuitry has not fully started up, the output status signal is at the low level. The power-ON reset signal POR1 (and the power-ON reset signal POR2 in the embodiments of FIGS. 6 and 8) are also at the low level. Thereafter, when the input voltage reaches the input voltage predetermined level, the input status signal and the initial power-ON reset signal POR0 switch to the high level, and the power-ON reset procedure transits from the initial stage SS to the processing stage SO1.

Because the input status signal is at the high level, indicating that the input voltage is ready, the voltage conversion apparatus starts voltage conversion operation, and the output voltage correspondingly increases in the output rising stage SR. Because power is transmitted from the input side to the output side, the input voltage fluctuates, and if the output sides requires a relatively larger current, the input voltage may drop lower than the input voltage predetermined level, causing the input status signal to switch to the low level. Referring to FIGS. 4 and 9, when the input status signal is at the low level, the determination circuit 155 sets the output status signal to the high level, and when the input status signal is at the high level, the determination circuit 155 sets the output status signal to follow the output comparison signal. Because the output voltage is not ready yet, the output comparison signal is at the low level; therefore, when the input status signal is at the high level, the output status signal is at the high level. Hence, in the output rising stage SR, when the input voltage fluctuates, the input status signal and the output status signal toggle in an opposite way.

The output voltage gradually increases and at the end of the output rising stage SR it reaches the output voltage predetermined level. The output status signal switches to the high level. Referring to FIGS. 7 and 9, because the input status signal, the output status signal and the initial power-ON reset signal POR0 are all at the high level, the reset signal RST1 switches to the low level, and the multi-bit counter circuit 1931 starts counting; that is, the delay circuit 193 starts operating to delay a first predetermined period of time T1. At the end of this period T1, the power-ON reset signal POR1 is generated. Referring to FIGS. 6, 8 and 9, preferred but not necessary, the power-ON reset signal POR2 is generated after a second predetermined period of time T2 from the generation of the power-ON reset signal POR1. Thus, the power-ON reset procedure is completed and the circuitry enters a stable stage SF (in the processing stage SO1).

In a heavy loading condition, a load circuit (not shown) which receives power from the output voltage may require a large current, causing the output voltage and hence the input voltage to fluctuate in the unstable stage SU (in the processing stage SO2). If the fluctuation only causes the output voltage to drop below the output voltage predetermined level but does not cause the input voltage to drop below the input voltage predetermined level, the power-ON reset signal POR1 and the power-ON reset signal POR2 do not change their states. After the load circuit receives enough power, the fluctuation ends and the circuitry enters a stable stage SF (in the processing stage SO2).

However, as shown in the processing stage SO3, for example if the load circuit draws an extremely large current or if the power supply providing the input voltage is temporarily unstable, both the input voltage drops below the input voltage predetermined level and the output voltage drops below the output voltage predetermined level, and the input status signal and the output status signal toggle in the opposite way again. The power-ON reset signal POR1 and the power-ON reset signal POR2 both switch to the low level. The processing stage SO3 repeats a similar process as the processing stage SO1, until both the input voltage and the output voltage are ready, and the power-ON reset signal POR1 and the power-ON reset signal POR2 switch to the high level.

Figure 10:
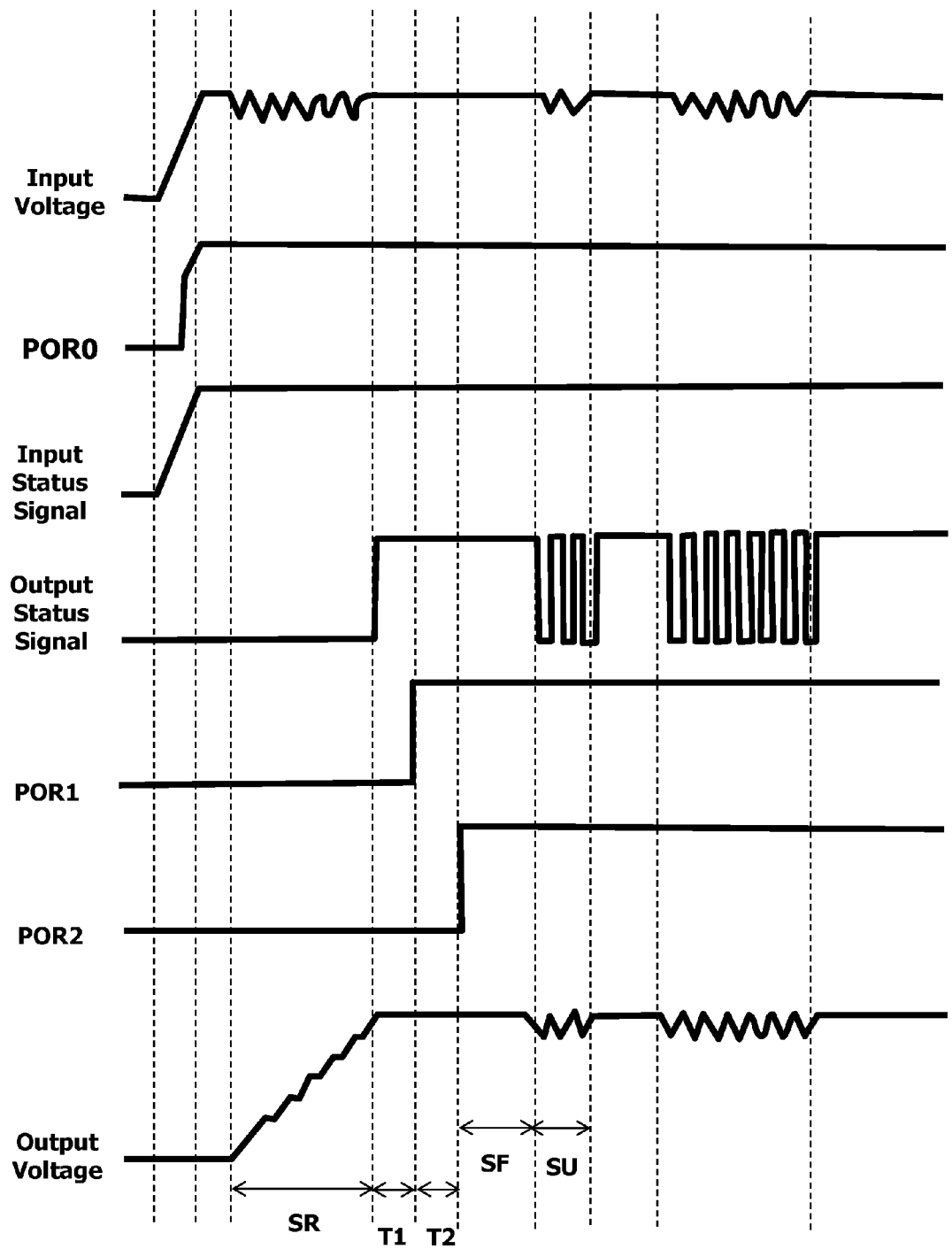
FIG. 10 shows a tenth embodiment of the present invention, which shows another embodiment of the control method of the voltage conversion apparatus.

FIG. 10 shows a tenth embodiment of the present invention, which shows another embodiment of the control method of the voltage conversion apparatus by signal waveforms. This embodiment is different from the ninth embodiment in that the power supply providing the input voltage has a stronger power supplying capability. In this case, the input voltage does not significantly drop below the input voltage predetermined level because of the load circuit. Therefore, the input voltage and the output voltage are stable and there are only minor fluctuations in the output rising stage SR, but the input status signal remains at the high level in the output rising stage SR. Besides the relatively more stable input voltage and the output voltage, the control method of this embodiment is the same as the ninth embodiment.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, a device or circuit that does not influence the main meanings of the signals, such as a switch or a logic circuit, can be inserted between two devices or circuits that are shown to be in direction connection in the embodiments. For another example, the conversion circuit is not limited to a charge pump, but may be other types of voltage conversion circuits such as a switching regulator, etc. For another example, the meanings of the high and low levels of a digital signal can be interchanged, with corresponding modifications of circuits processing these signals. For another example, the one-time reset circuit can be any other forms of the power-ON reset circuit or any other forms of the voltage level detection circuit. In view of the foregoing, the spirit of the present invention should cover all such and other modifications and variations, which should be interpreted to fall within the scope of the following claims and their equivalents. Further, an embodiment or a claim of the present invention does not need to achieve all the objectives or advantages of the present invention. The title and abstract are provided for assisting searches but not for limiting the scope of the present invention.

What is claimed is:

1. A voltage conversion apparatus, comprising:
   a conversion circuit, for converting an input voltage to an output voltage according to a status feedback signal;
   an input status detection circuit, which is coupled to the conversion circuit, for generating an input status signal according to the input voltage and a first reference voltage;
   an output status detection circuit, which is coupled to the conversion circuit and the input status detection circuit, for generating an output status signal according to the input status signal, the output signal, and a second reference voltage;
   a status feedback circuit, which is coupled to the output status detection circuit and the conversion circuit, for generating the status feedback signal according to the output status signal; and
   a power-ON reset circuit, which is coupled to the input status detection circuit and the output status detection circuit, for generating a power-ON reset signal according to the input status signal, the output status signal, and a first feedback signal, wherein the power-ON reset signal indicates whether a power-ON reset procedure of the voltage conversion apparatus is completed, the power-ON reset circuit including:
      a first logic circuit, which is coupled to the input status detection circuit and the output status detection circuit, for generating a first reset signal according to the input status signal and the output status signal, and generating a first determined clock signal according to the first feedback signal and a clock signal, wherein the first reset signal is set to a predetermined first reset signal level when both the input status signal indicates that the input voltage is ready and the output status signal indicates that the output voltage is ready; and
      a first delay circuit, which is coupled to the first logic circuit, for delaying a first predetermined period of time according to the first reset signal and the first determined clock signal, to generate a first power-ON reset signal related to the power-ON reset signal, wherein the first reset signal determines whether to start the first predetermined period of time and the first determined clock signal determines a clock to count the first predetermined period of time;
   wherein the first feedback signal relates to the first power-ON reset signal.

2. The voltage conversion apparatus of claim 1, wherein after the first reset signal is set to the predetermined first reset signal level, when either the input status signal indicates that the input voltage is not ready or the output status signal indicates that the output voltage is not ready, the first reset signal is still set to the predetermined first reset signal level, and when both the input status signal indicates that the input voltage is not ready and the output status signal indicates that the output voltage is not ready, the first reset signal is set not to be at the predetermined first reset signal level.

3. The voltage conversion apparatus of claim 1, wherein the conversion circuit includes a charge pump circuit, and wherein the status feedback signal includes a first clock signal and a second clock signal which do not overlap each other, for operating different power switches respectively to boost the input voltage to the output voltage.

4. The voltage conversion apparatus of claim 1, wherein the input status detection circuit includes:
   a first voltage divider circuit, which is coupled to the conversion circuit, for receiving the input voltage to generate a first divided voltage; and
   a first comparison circuit, which is coupled to the first voltage divider circuit, for comparing the first divided voltage with the first reference voltage, to generate the input status signal.

5. The voltage conversion apparatus of claim 1, wherein the output status detection circuit includes:
   a second voltage divider circuit, which is coupled to the conversion circuit, for receiving the output voltage to generate a second divided voltage;
   a second comparison circuit, which is coupled to the second voltage divider circuit, for comparing the second divided voltage with the second reference voltage, to generate an output comparison signal; and
   a determination circuit, which is coupled to the input status detection circuit and the second comparison circuit, for generating the output status signal according to the input status signal and the output comparison signal.

6. The voltage conversion apparatus of claim 5, wherein when the input status signal indicates that the input voltage is not ready, the determination circuit sets the output status signal to a predetermined output status signal level, and when the input status signal indicates that the input voltage is ready, the determination circuit sets the output status signal to follow the output comparison signal.

7. The voltage conversion apparatus of claim 1, wherein the first logic circuit further includes a one-time reset circuit for generating an initial power-ON reset signal to indicate whether the input voltage is ready, and after the initial power-ON reset signal indicates that the input voltage is ready, the initial power-ON reset signal does not change state until the voltage conversion apparatus is shut down.

8. The voltage conversion apparatus of claim 1, wherein the power-ON reset circuit further includes:
   a second logic circuit, which is coupled to the first delay circuit, for generating a second reset signal according to the first power-ON reset signal, and generating a second determined clock signal according to a second feedback signal and the clock signal; and
   a second delay circuit, which is coupled to the second logic circuit, for delaying a second predetermined period of time according to the second reset signal and the second determined clock signal, so as to generate a second power-ON reset signal, wherein the second reset signal determines whether to start the second predetermined period of time and the second determined clock signal determines a clock to count the second predetermined period of time;
   wherein the second feedback signal relates to the second power-ON reset signal.

9. A power-ON reset circuit of a voltage conversion apparatus which converts an input voltage to an output voltage according to a status feedback signal, the power-ON reset circuit comprising:
   a first logic circuit, for generating a first reset signal which is set to a predetermined first reset signal level when both the input voltage is ready and the output voltage is ready, and generating a first determined clock signal according to a first feedback signal and a clock signal; and a first delay circuit for delaying a first predetermined period of time according to the first reset signal and the first determined clock signal, to generate a first power-ON reset signal, wherein the first reset signal determines whether to start the first predetermined period of time and the first determined clock signal determines a clock to count the first predetermined period of time;

wherein the first feedback signal relates to the first power-ON reset signal.

10. The power-ON reset circuit of claim 9, wherein after the first reset signal is set to the predetermined first reset signal level, when either the input voltage is not ready or the output voltage is not ready, the first reset signal is still set to the predetermined first reset signal level, and when both the input voltage is not ready and the output voltage is not ready, the first reset signal is set not to be at the predetermined first reset signal level.

11. The power-ON reset circuit of claim 9, wherein the first logic circuit further includes a one-time reset circuit for generating an initial power-ON reset signal to indicate whether the input voltage is ready, and after the initial power-ON reset signal indicates that the input voltage is ready, the initial power-ON reset signal does not change state until the voltage conversion apparatus is shut down.

12. The power-ON reset circuit of claim 9, wherein the power-ON reset circuit further includes:

a second logic circuit, which is coupled to the first delay circuit, for generating a second reset signal according to the first power-ON reset signal, and generating a second determined clock signal according to a second feedback signal and the clock signal; and a second delay circuit, which is coupled to the second logic circuit, for delaying a second predetermined period of time according to the second reset signal and the second determined clock signal, so as to generate a second power-ON reset signal, wherein the second reset signal determines whether to start the second predetermined period of time and the second determined clock signal determines a clock to count the second predetermined period of time;

wherein the second feedback signal relates to the second power-ON reset signal.

13. A control method of a voltage conversion apparatus, comprising:

converting an input voltage to an output voltage according to a status feedback signal;

generating an input status signal according to the input voltage and a first reference voltage;

generating an output status signal according to the input status signal, the output signal, and a second reference voltage;

generating the status feedback signal according to the output status signal; and generating a power-ON reset signal according to the input status signal, the output status signal, and a first feedback signal, wherein the power-ON reset signal indicates whether a power-ON reset procedure of the voltage conversion apparatus is completed;

wherein the step of generating the power-ON reset signal includes:

generating a first reset signal according to the input status signal and the output status signal, and generating a first determined clock signal according to the first feedback signal and a clock signal, wherein the first reset signal is set to a predetermined first reset signal level when both the input status signal indicates that the input voltage is ready and the output status signal indicates that the output voltage is ready; and delaying a first predetermined period of time according to the first reset signal and the first determined clock signal, to generate a first power-ON reset signal related to the power-ON reset signal, wherein the first reset signal determines whether to start the first predetermined period of time and the first determined clock signal determines a clock to count the first predetermined period of time;

wherein the first feedback signal relates to the first reset signal.

14. The control method of claim 13, wherein after the first reset signal is set to the predetermined first reset signal level, when either the input status signal indicates that the input voltage is not ready or the output status signal indicates that the output voltage is not ready, the first reset signal is still set to the predetermined first reset signal level, and when both the input status signal indicates that the input voltage is not ready and the output status signal indicates that the output voltage is not ready, the first reset signal is set not to be at the predetermined first reset signal level.

15. The control method of claim 13, wherein the status feedback signal includes a first clock signal and a second clock signal which do not overlap each other, for operating different power switches respectively to boost the input voltage to the output voltage.

16. The control method of claim 13, wherein the step of generating the input status signal includes:

receiving the input voltage to generate a first divided voltage; and comparing the first divided voltage with the first reference voltage to generate the input status signal.

17. The control method of claim 13, wherein the step of generating the output status signal includes:

receiving the output voltage to generate a second divided voltage;

comparing the second divided voltage with the second reference voltage, to generate an output comparison signal; and generating the output status signal according to the input status signal and the output comparison signal.

18. The control method of claim 13, wherein the step of generating the first reset signal further includes: generating an initial power-ON reset signal to indicate whether the input voltage is ready, and after the initial power-ON reset signal indicates that the input voltage is ready, the initial power-ON reset signal does not change state until the voltage conversion apparatus is shut down.

19. The control method of claim 13, wherein the step of generating the power-ON reset signal further includes:

generating a second reset signal according to the first power-ON reset signal, and generating a second determined clock signal according to a second feedback signal and the clock signal; and delaying a second predetermined period of time according to the second reset signal and the second determined clock signal, so as to generate a second power-ON reset signal, wherein the second reset signal determines whether to start the second predetermined period of time and the second determined clock signal determines a clock to count the second predetermined period of time;

wherein the second feedback signal relates to the second power-ON reset signal.

* * * * *